United States Patent
Robak (10) Patent No.: US 11,255,267 B2
(45) Date of Patent: Feb. 22, 2022

(54) METHOD OF COOLING A GAS TURBINE AND APPARATUS

(71) Applicant: United Technologies Corporation, Farmington, CT (US)

(72) Inventor: Christopher W. Robak, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 271 days.

(21) Appl. No.: 16/386,527

(22) Filed: Apr. 17, 2019

(65) Prior Publication Data

US 2020/0131992 A1    Apr. 30, 2020

Related U.S. Application Data

(60) Provisional application No. 62/753,582, filed on Oct. 31, 2018.

(51) Int. Cl.
*F02C 7/18* (2006.01)

(52) U.S. Cl.
CPC .......... *F02C 7/18* (2013.01); *F05D 2260/201* (2013.01)

(58) Field of Classification Search
CPC ............... F02C 7/18; F05D 2260/201; F05D 2220/3212; Y02T 50/60; F01D 11/001; F01D 11/04; F01D 5/082
See application file for complete search history.

(56) References Cited

U.S. PATENT DOCUMENTS

| | | | | |
|---|---|---|---|---|
| 5,157,914 A | * | 10/1992 | Schwarz | F01D 5/081 60/795 |
| 6,065,928 A | | 5/2000 | Rieck | |
| 6,481,959 B1 | * | 11/2002 | Morris | F01D 5/082 415/115 |
| 64,891,959 | | 11/2002 | Morris et al. | |
| 8,038,399 B1 | * | 10/2011 | Liang | F01D 11/04 416/95 |
| 8,152,436 B2 | | 4/2012 | Glasspoole et al. | |
| 8,262,342 B2 | | 9/2012 | Morris et al. | |
| 8,740,554 B2 | | 6/2014 | Virkler et al. | |
| 9,765,699 B2 | | 9/2017 | Kirtley et al. | |
| 2005/0201857 A1 | * | 9/2005 | Ferra | F01D 5/082 415/115 |

(Continued)

OTHER PUBLICATIONS

EP Search Report for EP Application No. 19205990 dated Mar. 27, 2020.

*Primary Examiner* — Aaron R Eastman
(74) *Attorney, Agent, or Firm* — Carlson, Gaskey & Olds, P.C.

(57) ABSTRACT

A method of designing a gas turbine engine includes locating purge openings in fluid communication with a first stage cavity. At least one of a cover plate or a rotor disk is positioned adjacent the first stage cavity and radially inward from the purge openings. A portion of a rotor blade is positioned radially outward from the purge openings. A mass flow rate of cooling air through the purge openings is selected based on a radial location of the purge openings to create an air barrier between a radially inner side of the purge openings and a radially outer side of the purge openings.

18 Claims, 4 Drawing Sheets

(56) References Cited

U.S. PATENT DOCUMENTS

| | | | |
|---|---|---|---|
| 2015/0118016 A1* | 4/2015 | Huth | F01D 5/082 |
| | | | 415/1 |
| 2016/0186664 A1* | 6/2016 | Kirtley | F02C 7/18 |
| | | | 415/115 |
| 2016/0312631 A1* | 10/2016 | Bergman | F01D 11/04 |
| 2017/0082026 A1* | 3/2017 | Zelesky | F01D 5/082 |
| 2017/0145832 A1* | 5/2017 | Mongillo | F01D 5/187 |
| 2017/0159440 A1* | 6/2017 | Willett, Jr | F01D 5/24 |
| 2018/0306058 A1* | 10/2018 | Lewis | F01D 25/12 |
| 2019/0226344 A1* | 7/2019 | LoRicco | F01D 9/065 |
| 2020/0386103 A1* | 12/2020 | Generale | F01D 5/186 |

\* cited by examiner

METHOD OF COOLING A GAS TURBINE AND APPARATUS

CROSS-REFERENCE TO RELATED APPLICATIONS

This application claims priority to U.S. Provisional Application No. 62/753,582, which was filed on Oct. 31, 2018 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

One challenge in the design of gas turbine engines, is that the hot gases in the area of the turbine can move radially inward into an inner cavity. The occurrence of hot gases entering the inner cavity is generally referred to as ingestion and is undesirable. Ingestion of hot gases into the inner cavity can lead to increased corrosion of components in the inner cavity. Purge air is directed into the inner cavity at an interface between the turbine rotor and an associated transition housing to resist this flow of hot gas. Utilizing large amounts of purge air can lead to lower component efficiencies and higher thrust specific fuel consumption. This leads to higher fuel consumption for any given flight condition. Furthermore, uncaptured purge air can result in higher combustion exit temperatures and potentially reduce turbine component life. Therefore, it is desirable to reduce the amount of purge air needed to resist the ingestion of hot gases into the inner cavity.

SUMMARY

In one exemplary embodiment, a method of designing a gas turbine engine includes locating purge openings in fluid communication with a first stage cavity. At least one of a cover plate or a rotor disk is positioned adjacent the first stage cavity and radially inward from the purge openings. A portion of a rotor blade is positioned radially outward from the purge openings. A mass flow rate of cooling air through the purge openings is selected based on a radial location of the purge openings to create an air barrier between a radially inner side of the purge openings and a radially outer side of the purge openings.

In a further embodiment of the above, the mass flow rate of cooling air through the purge openings is less than the mass flow rate needed to purge the first stage cavity of exhaust gases.

In a further embodiment of any of the above, the first stage cavity is a first stage forward cavity and the purge openings extend through a static structure forward of the first stage forward cavity and are in fluid communication with a compressor section.

In a further embodiment of any of the above, aft purge openings are located in fluid communication with a first stage aft cavity. The aft purge openings are in fluid communication with the compressor section through at least one passage that extends through at least one of a plurality of vanes.

In a further embodiment of any of the above, at least one of an aft cover plate or an aft rotor disk is positioned adjacent the first stage aft cavity and radially inward from the aft purge openings and positioning a portion of a second rotor blade radially outward from the aft purge openings to create an air barrier between a radially inner side of the aft purge openings and a radially outer side of the aft purge openings.

In a further embodiment of any of the above, a mass flow rate of cooling air through the aft purge openings is selected based on a radial location of the purge openings.

In a further embodiment of any of the above, the mass flow rate of cooling air through the aft purge openings is less than the mass flow rate needed to purge the first stage aft cavity of exhaust gases.

In a further embodiment of any of the above, the purge openings extend in a direction transverse to an axis of rotation of the gas turbine engine.

In a further embodiment of any of the above, the purge openings include a first plurality of purge openings that extend in a direction with a component in a radially inward direction. A second plurality of purge openings extend in a direction with a component in a radially outward direction.

In a further embodiment of any of the above, the purge openings extend in a direction having a component in a circumferential direction.

In another exemplary embodiment, a gas turbine engine includes a first vane assembly. A first rotor assembly is located axially aft of the first vane assembly. A cover plate engages the first vane assembly and the first rotor assembly. The first vane assembly, the first rotor assembly, and the cover plate at least partially define a first stage cavity. A plurality of purge openings are in fluid communication with the first stage cavity and are located radially outward from the cover plate.

In a further embodiment of any of the above, the first stage cavity is a first stage forward cavity. The purge openings extend through a static structure forward of the first stage forward cavity and are in fluid communication with a compressor section.

In a further embodiment of any of the above, a first stage aft cavity and aft purge openings are in fluid communication with the first stage aft cavity and in fluid communication with the compressor section through at least one passage that extends through at least one of a plurality of vanes of the vane assembly.

In a further embodiment of any of the above, at least one of an aft cover plate or an aft rotor disk is adjacent the first stage aft cavity and is radially inward from the aft purge openings. A portion of a second rotor blade is located radially outward from the aft purge openings.

In a further embodiment of any of the above, the aft purge openings extend in a direction transverse to an axis of rotation of the gas turbine engine.

In a further embodiment of any of the above, the aft purge openings include a first plurality of aft purge openings that extend in a direction with a component in a radially inward direction. A second plurality of aft purge openings extend in a direction with a component in a radially outward direction.

In a further embodiment of any of the above, the purge openings extend in a direction having a component in a circumferential direction.

In a further embodiment of any of the above, the purge openings extend in a direction transverse to an axis of rotation of the gas turbine engine.

In a further embodiment of any of the above, the purge openings include a first plurality of purge openings that extend in a direction with a component in a radially inward direction. A second plurality of purge openings extend in a direction with a component in a radially outward direction.

In a further embodiment of any of the above, the purge openings extend in a direction having a component in a circumferential direction.

DETAILED DESCRIPTION

Figure 1:
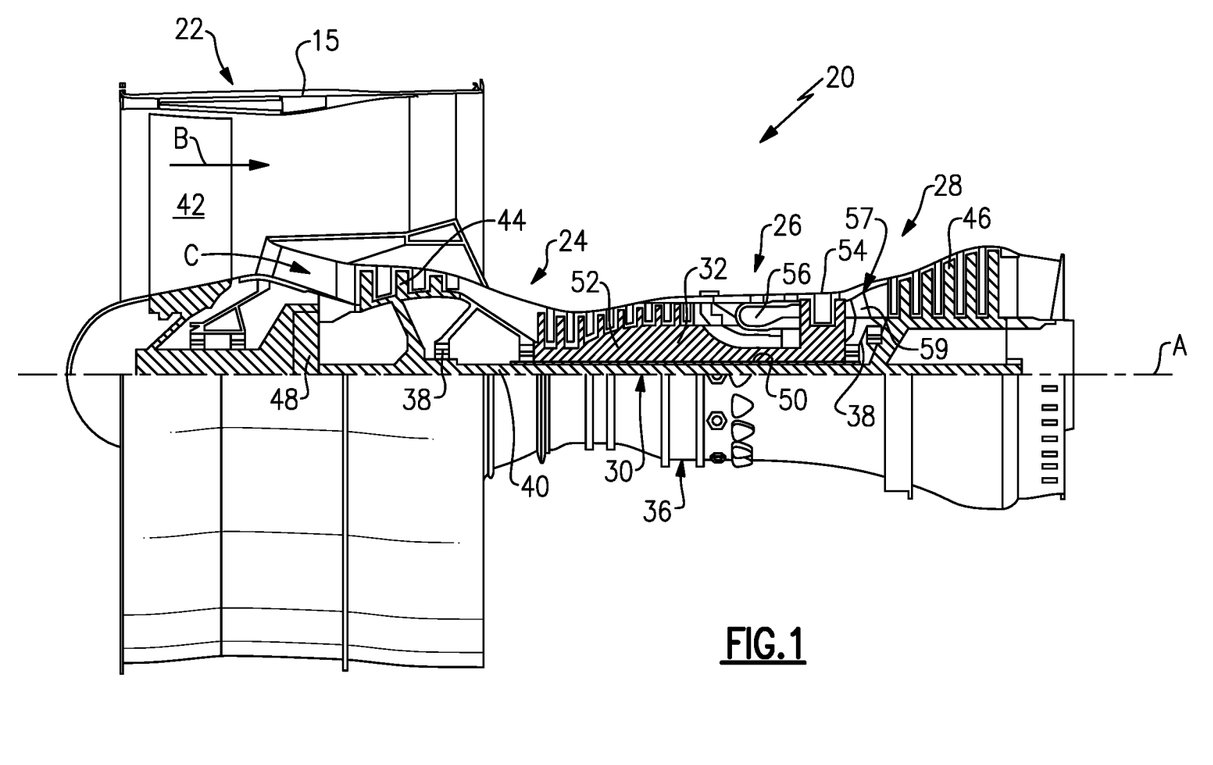
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a fan case 15 or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
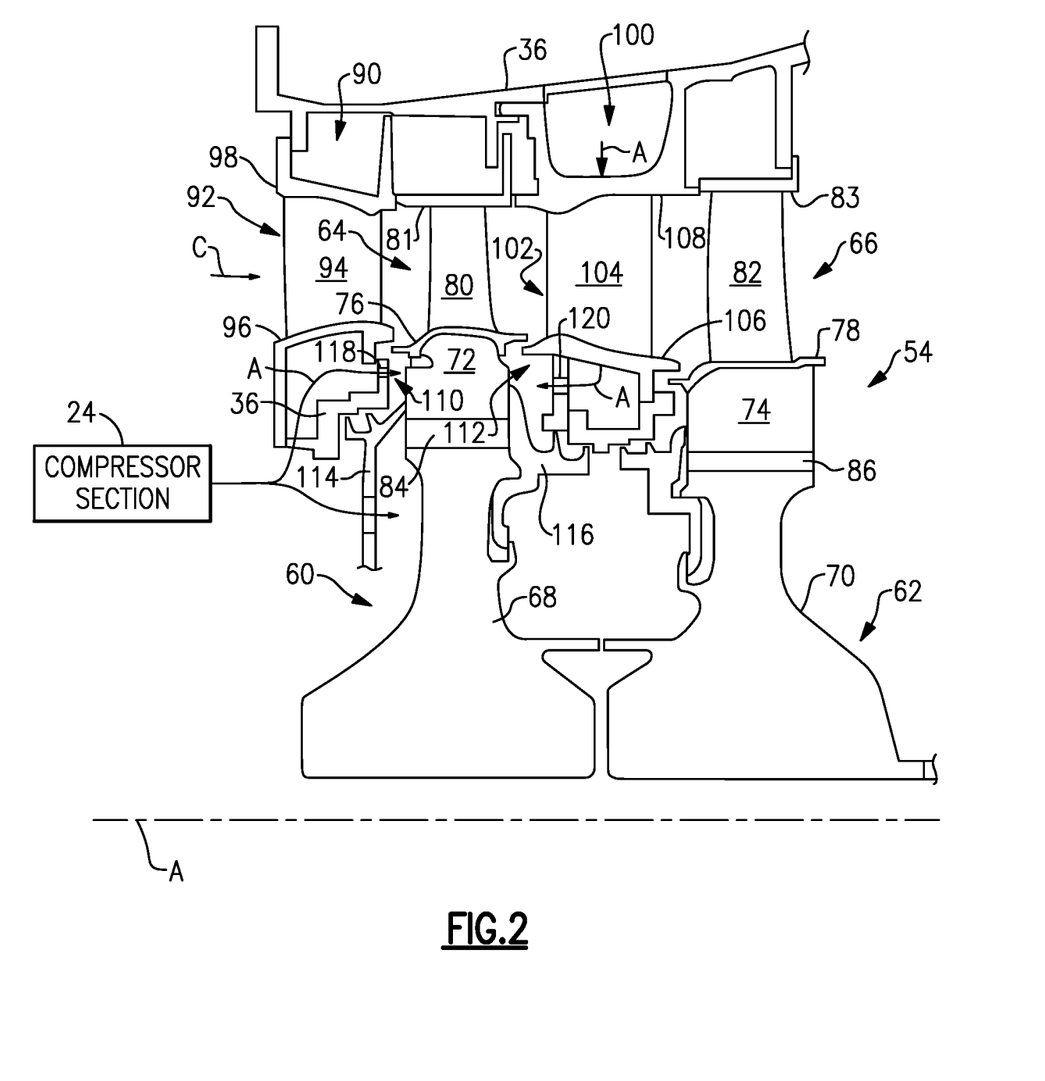
FIG. 2 is a schematic view of an example high pressure turbine.

FIG. 2 illustrates an enlarged schematic view of the high pressure turbine 54, however, other sections of the gas turbine engine 20 could benefit from this disclosure, such as the low pressure turbine 46 or the compressor section 24. In the illustrated example, the high pressure turbine 54 is a two-stage turbine with a first rotor assembly 60 and a second rotor assembly 62. However, this disclosure also applies to high pressure turbines 54 with only a one-stage turbine or low pressure turbines 46 with a turbine having more than two stages.

The first rotor assembly 60 includes first rotor blades 64 that form an array of circumferentially spaced blades around a first disk 68 and the second rotor assembly 62 includes second rotor blades 66 that form an array of circumferentially spaced blades around a second disk 70. The first and second rotor blades 64, 66 include a respective first root portion 72 and a second root portion 74, a first platform 76 and a second platform 78, and a first airfoil 80 and a second airfoil 82. Each of the first and second root portions 72, 74 is received within respective first and second rims 84, 86 of the first and second disks 68, 70. The first airfoil 80 and the second airfoil 82 extend radially outward toward a first and second blade outer air seal (BOAS) assembly 81, 83, respectively.

The first and second rotor blades 64, 66 are disposed in the core airflow path C that is pressurized in the compressor section 24 then heated to a working temperature in the combustor section 26. The first and second platforms 76, 78 separate a gas path side inclusive of the first and second airfoils 80, 82 and a non-gas path side inclusive of the respective first and second root portions 72, 74.

A first vane assembly 90 is located axially upstream of the first rotor assembly 60 and is fixed relative to the engine static structure 36. The first vane assembly 90 includes vanes 92 that form a circumferential array. The vanes 92 each include an airfoil 94 that extends between a respective inner vane platform 96 and an outer vane platform 98. The outer vane platform 98 may at least partially engage the first BOAS 81 and the inner vane platform 96 cooperates with the first platform 76 to direct the hot exhaust gases along the core airflow path C.

A second vane assembly 100 is also located secured to the engine case structure 36 and located between the first rotor assembly 60 and the second rotor assembly 62. The second vane assembly 100 directs the hot exhaust gases along the core airflow path C from the first rotor blades 64 to the second rotor blades 66. The second vane assembly 100 includes vanes 102 that from a circumferential array. The vanes 102 include an airfoil 104 that extends between a respective inner vane platform 106 and an outer vane platform 108. The outer vane platform 108 may at least partially engage the first BOAS 81 and the second BOAS 83 while the inner vane platform 106 cooperates with the first platform 76 and the second platform 78 to direct the hot exhaust gases along the core airflow path C.

Although the vane inner platforms 96, 106 and first and second platforms 76, 78 cooperate with each other to direct the hot exhaust gases along the core airflow path C, the hot exhaust gases can still be ingested into a first stage forward cavity 110 and a first stage aft cavity 112. This disclosure also applies to ingestion in other downstream forward and aft cavities for other stages in a similar manner as described with respect to the first stage forward cavity 110 and first stage aft cavity 112.

The first stage forward cavity 110 is located downstream of the first vane assembly 90 and is bounded by the first vane assembly 90, first rotor assembly 60, and a first stage forward cover plate 114. The first stage aft cavity 112 is located downstream of the first rotor assembly 60 and is bounded by the first rotor assembly 60, a first stage aft cover plate 116, and the second vane assembly 100.

During operation of the gas turbine engine 20, the hot exhaust gases can enter the first stage forward cavity 110 as indicated above. To prevent the ingestion of the hot exhaust gases into the first stage forward cavity 110, bleed air A from the compressor section 24 is directed into the first stage forward cavity 110 through a plurality of purge openings 118. The purge openings 118 are circumferentially spaced around the static structure 36 in order to direct the bleed air A into the first stage forward cavity 110. Alternatively, the purge opening 118 could be located in the first vane assembly 90 and be in fluid communication with the first stage forward cavity 110. Furthermore, the number and/or cross-sectional area of the purge openings 118 can be varied in order to achieve a desired mass flow rate of bleed air A into the first stage forward cavity 110. For example, the purge openings 118 could be circular or slotted.

Also, the purge openings 118 could extend in a direction that is transverse to the engine axis A and include a first set of purge openings 118 extending towards the engine axis A and a second set of purge openings 118 extending away from the engine axis A. The purge openings 118 could also extend in a direction having a component directed in a circumferential direction, such as with or against the direction of rotation of the first rotor assembly 60.

Figure 3:
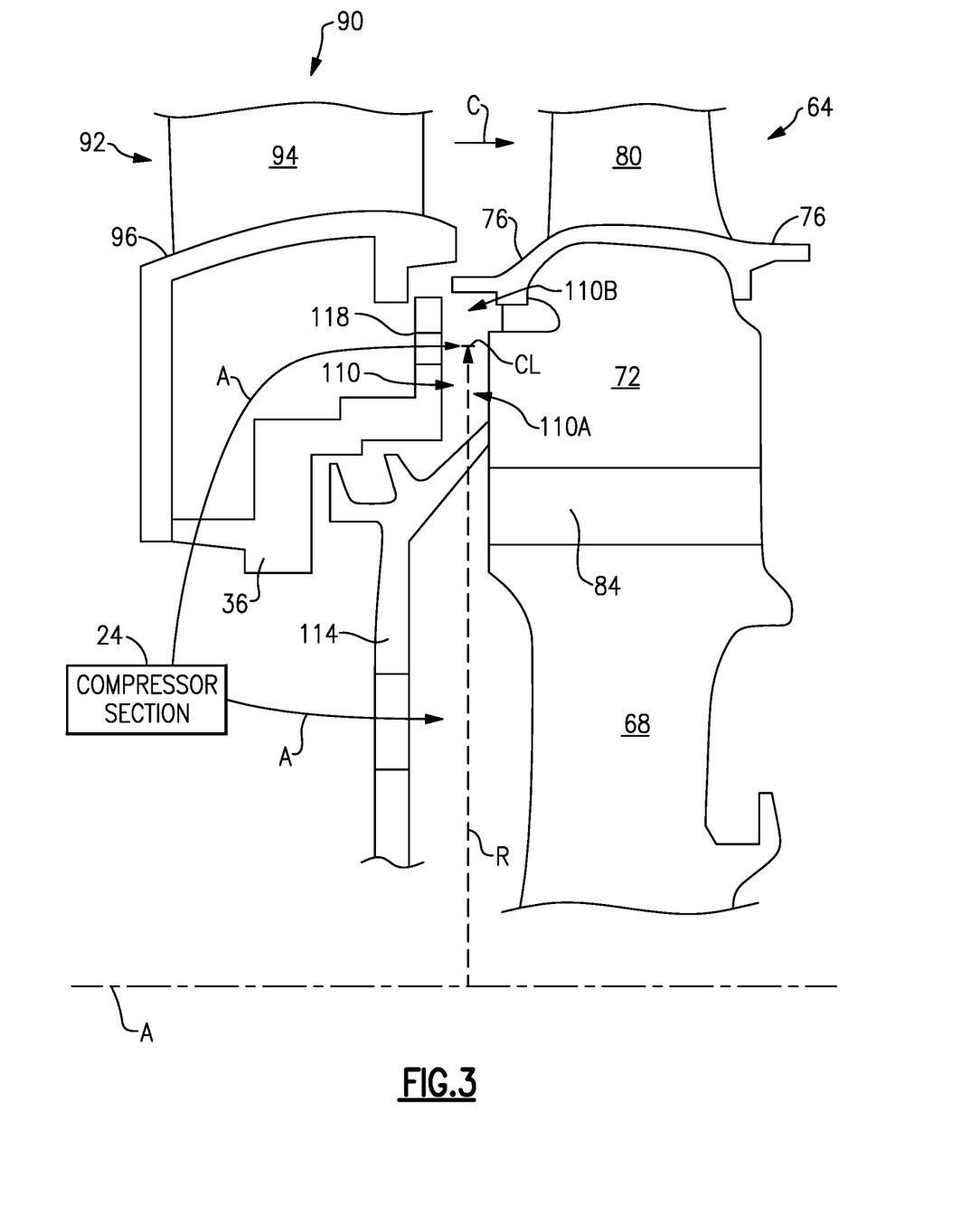
FIG. 3 is an enlarged view of the high pressure turbine of FIG. 2.

A radial location of the purge openings 118 contributes to adequately cooling specific components adjacent the first stage forward cavity 110 as described further below. FIG. 3 is an enlarged view of the first stage forward cavity 110. The radial position of the purge openings 118 is measured to a center line CL of each of the purge opening 118. However, the purge openings 118 could be non-circular in cross section and another identifying location on the purge openings 118 could be used as long as the position measured is consistent between purge openings 118. The center line CL of the purge openings 118 creates a division in the first stage forward cavity 110 between a radially inner portion 110A and a radially outer portion 110B. The purge openings 118 create an air barrier that separates the radially inner portion 110A with low ingestion from the radially outer portion 110B with higher ingestion. In one example, the purge openings 118 are aligned with the top of the first disk 68 to create an air barrier that is radially aligned with the top of the first disk 68.

The radial location of purge openings 118 contributes to a variation in sealing effectiveness of the first stage forward cavity 110 between the radially inner portion 110A and the radially outer portion 110B. The sealing effectiveness in the first stage forward cavity 110 is a ratio of the hot exhaust gases from the core airflow path C compared to bleed air A that enters the first stage forward cavity 110. A sealing effectiveness of zero indicates that the rim cavity is entirely fill with air ingested from the gas path and a sealing effectiveness of 1 indicates that the rim cavity is entirely filled with air from a secondary source, such as purge air.

In order to achieve a desired sealing effectiveness, the radially inner portion 110A requires a lower mass flow rate of bleed air A compared to the sealing effectives of the radially outer portion 110B at the same mass flow rate of bleed air A through the purge openings 118. The variation of sealing effectiveness is represented graphically in FIGS. 4 and 5.

Figure 4:
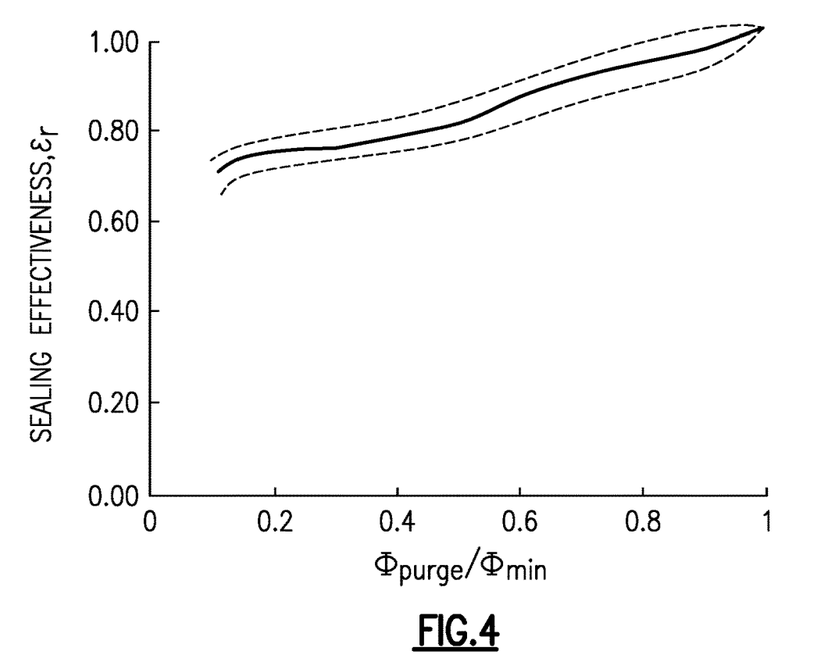
FIG. 4 is an example graph of sealing effectiveness for a radially inner cavity portion.

FIG. 4 illustrates the sealing effectiveness of the radially inner portion 110A on the vertical axis and a non-dimensionalized flow rate of bleed air A on the horizontal axis. A margin of error for sealing effectiveness is shown in dashed lines above and below the solid line representing the sealing effectiveness within the margin of error. The non-dimensionalized flow rate is calculated by dividing the mass flow rate of bleed air A (Dpurge) entering the first stage forward cavity 110 through the purge openings 118 by the minimum mass flow rate of bleed air A (Dmin) needed to achieve a complete sealing effectiveness (equal to 1) across the entire first stage forward cavity 110. Similarly, FIG. 5 illustrates the same relationship described above in FIG. 4, but with respect to the radially outer portion 110B of the first stage forward cavity 110.

Figure 5:
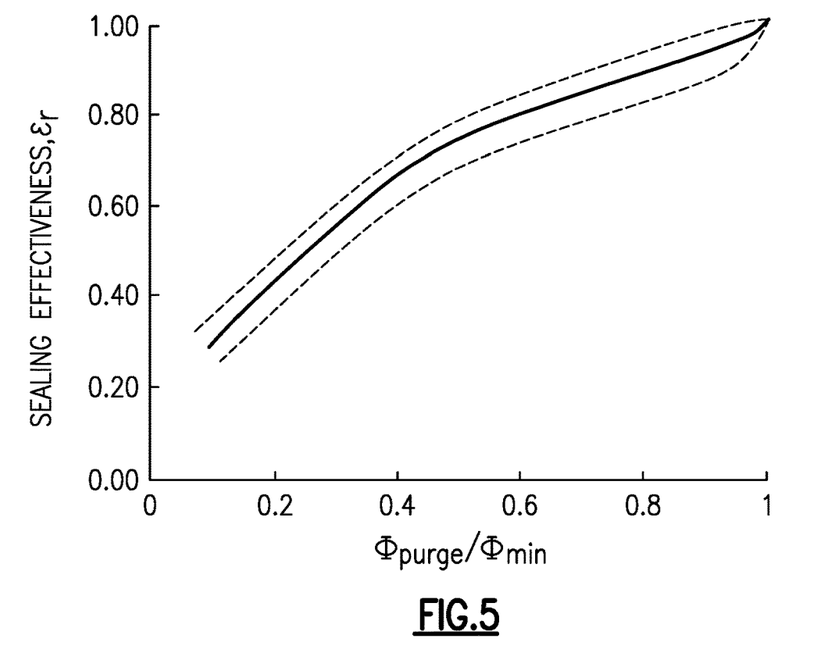
FIG. 5 is an example graph of sealing effectiveness for a radially outer cavity portion.

As shown in FIGS. 4 and 5, the sealing effectiveness achieved at lower non-dimensionalized flow rates is greater in the radially inner portion 110A than compared to the radially outer portion 110B. In the illustrated example, at a non-dimensionalized flow rate of approximately 0.2, the radially inner portion 110A includes a sealing effectiveness of approximately 0.70 to 0.80 while the radially outer portion 110B includes a sealing effectiveness of approximately 0.40 to 0.50. As the non-dimensionalized flow rates approach 1 in FIGS. 4 and 5, the sealing effectiveness also approaches 1.

The variation in sealing effectiveness between the radially inner portion 110A and the radially outer portion 110B, allows for reductions in bleed air A needed to purge the first stage forward cavity 110. The reduction in bleed air A results in greater efficiency of the gas turbine engine 20 by allowing a greater percentage of air compressed in the compressor section 24 to be directed to the combustor section 26.

In particular, certain portions of the first vane assembly 90 and the first rotor assembly 60 have a greater sensitivity to hot exhaust gases and therefore require more bleed air A to purge the first stage forward cavity 110. However, by selecting a location for the purge openings 118 that takes into consideration of the components adjacent the first stage forward cavity 110, the bleed air A needed to cool these components can be reduced. For example, the first disk 68 and the cover plate 114 are more susceptible to damage and/or corrosion from the hot exhaust gases in the core airflow path C than the root portion 72 of the blade 64. Therefore, selecting a radial location for the purge openings 118 that is radially outward or at least radially aligned with the more sensitive components can reduce the amount of bleed air A needed for purging the first stage forward cavity 110.

Although FIGS. 4 and 5 are directed specifically to the first stage forward cavity 110, a similar result occurs with the first stage aft cavity 112. In particular, bleed air A is directed radially inward through the vanes 102 and reaches aft purge openings 120 in the vanes 102 (FIG. 2). In the illustrated example, a radially inner portion 112A (FIG. 2) of the first stage aft cavity 112 includes the aft cover plate 116 and the first disk 68, which are more susceptible to damage and/or corrosion by the hot exhaust gases from the core airflow path C. A radially outer portion 112B (FIG. 2) of the first stage aft cavity 112 includes the root portion 72 of the blade 64, which can sustain greater exposure to the hot exhaust gases from the core airflow path C.

This allows a lower mass flow rate of bleed air A to purge the first stage aft cavity 112 because the components that are more susceptible to damage from the hot exhaust gases are located radially inward from the aft purge openings 120 such that they can benefit from a high sealing effectiveness as compared to components adjacent the radially outer portion 112B.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of designing a gas turbine engine comprising:
locating purge openings in fluid communication with a first stage cavity;
positioning at least one of a cover plate or a first rotor disk adjacent the first stage cavity and radially inward from the purge openings;
positioning the purge openings in radial alignment relative to a central longitudinal axis of the gas turbine engine with a root portion of a rotor blade on a first rotor disk; and
selecting a mass flow rate of cooling air through the purge openings based on a radial location of the purge openings to create an air barrier between a radially inner side of the purge openings and a radially outer side of the purge openings;
wherein a center line of the purge openings are located radially inward relative to the central longitudinal axis of the gas turbine engine from a radially innermost side of the platform on the first rotor blade and radially outward from a radially outermost edge of the cover plate.

2. The method of claim 1, wherein the mass flow rate of cooling air through the purge openings is less than the mass flow rate needed to purge the first stage cavity of exhaust gases.

3. The method of claim 2, wherein the first stage cavity is a first stage forward cavity and the purge openings extend through a static structure located radially inward relative to the central longitudinal axis of the gas turbine engine from an innermost structure of each of a plurality of first vanes forward of the first stage forward cavity and the purge openings are in fluid communication with a compressor section.

4. The method of claim 3, further comprising locating aft purge openings in fluid communication with a first stage aft cavity, wherein the aft purge openings are in fluid communication with the compressor section through at least one passage extending through at least one of a plurality of second vanes downstream of the rotor blade.

5. The method of claim 4, further comprising positioning an aft cover plate on an aft side of the first rotor disk with the aft cover plate located radially inward relative to the central longitudinal axis of the gas turbine engine from the aft purge openings and positioning a platform of the rotor blade radially outward from the aft purge openings to create an air barrier between a radially inner side of the aft purge openings and a radially outer side of the aft purge openings.

6. The method of claim 5, further comprising selecting a mass flow rate of cooling air through the aft purge openings based on a radial location of the purge openings and the mass flow rate of cooling air through the aft purge openings is less than the mass flow rate needed to purge the first stage aft cavity of exhaust gases.

7. The method of claim 1, wherein the purge openings extend in at least one of a direction transverse to an axis of rotation of the gas turbine engine or a circumferential direction.

8. The method of claim 1, wherein the purge openings include a first plurality of purge openings extending in a direction with a component in a radially inward direction and a second plurality of purge openings extending in a direction with a component in a radially outward direction.

9. The method of claim 1, wherein the purge openings are located radially inward relative to the central longitudinal axis of the gas turbine engine from a radially inner side of a platform of the rotor blade.

10. A gas turbine engine comprising:
a first vane assembly having a plurality of first vanes with an inner platform and an outer platform;
a first rotor assembly located axially aft of the first vane assembly having a plurality of first rotor blades each having a first root portion attached to a first rotor disk;
a cover plate engaging the first vane assembly and the first rotor assembly, wherein the first vane assembly, the first rotor assembly, and the cover plate at least partially define a first stage cavity, and a plurality of purge openings in fluid communication with the first stage cavity and located radially outward from the cover plate and the plurality of purge openings are radially aligned relative to a central longitudinal axis of the gas turbine engine with the first root portion on each of the plurality of first rotor blades, wherein a center line of the purge openings are located radially inward relative to the central longitudinal axis of the gas turbine engine from a radially innermost side of a first platform on each of the plurality of first rotor blades and radially outward from a radially outermost edge of the cover.

11. The gas turbine engine of claim 10, wherein the first stage cavity is a first stage forward cavity and the purge openings extend through a static structure located radially inward relative to the central longitudinal axis of the gas turbine engine from the innermost structure of each of the plurality of first vanes forward of the first stage forward cavity and the purge openings are in fluid communication with a compressor section.

12. The gas turbine engine of claim 11, further comprising a first stage aft cavity and aft purge openings in fluid communication with the first stage aft cavity and in fluid communication with the compressor section through at least one passage extending through at least one of a plurality of vanes of a second vane assembly.

13. The gas turbine engine of claim 12, further comprising an aft cover plate on an aft side of the first rotor disk adjacent the first stage aft cavity with the aft cover plate located radially inward relative to the central longitudinal axis of the gas turbine engine from the aft purge openings and a portion of an inner platform of each of the first rotor blades is located radially outward from the aft purge openings.

14. The gas turbine engine of claim 13, wherein the purge openings and the aft purge openings both extend in a direction transverse to an axis of rotation of the gas turbine engine.

15. The gas turbine engine of claim 13, wherein the aft purge openings include a first plurality of aft purge openings extending in a direction with a component in a radially inward direction and a second plurality of aft purge openings extending in a direction with a component in a radially outward direction.

16. The gas turbine engine of claim 13, wherein the purge openings extend in a direction having a component in a circumferential direction.

17. The gas turbine engine of claim 10, wherein the purge openings include a first plurality of purge openings extending in a direction with a component in a radially inward direction and a second plurality of purge openings extending in a direction with a component in a radially outward direction.

18. The gas turbine engine of claim 10, wherein the purge openings are located radially inward relative to the central longitudinal axis of the gas turbine engine from a radially inner side of a first platform on each of the plurality of first rotor blades.

* * * * *